(12) United States Patent
Dorsey et al.

(10) Patent No.: US 8,172,198 B2
(45) Date of Patent: May 8, 2012

(54) VALVE ASSEMBLY FOR AIRCRAFT WATER SUPPLY SYSTEM

(75) Inventors: Michael J. Dorsey, Uniontown, OH (US); George F. Owens, Akron, OH (US); Richard B. Yori, Akron, OH (US); Robert W. Hyde, Wadsworth, OH (US)

(73) Assignee: Goodrich Corporation, Charlotte, NC (US)

( * ) Notice: Subject to any disclaimer, the term of this patent is extended or adjusted under 35 U.S.C. 154(b) by 835 days.

(21) Appl. No.: 12/182,521

(22) Filed: Jul. 30, 2008

(65) Prior Publication Data

US 2009/0039306 A1    Feb. 12, 2009

Related U.S. Application Data

(60) Provisional application No. 60/987,438, filed on Nov. 13, 2007, provisional application No. 60/954,822, filed on Aug. 9, 2007.

(51) Int. Cl.
*F16K 31/44* (2006.01)
(52) U.S. Cl. .................. 251/71; 251/69; 251/129.01
(58) Field of Classification Search .............. 251/68, 251/69, 70, 71, 129.01
See application file for complete search history.

(56) References Cited

U.S. PATENT DOCUMENTS

| | | | |
|---|---|---|---|
| 3,279,744 A * | 10/1966 | Fieldsen et al. | 251/129.03 |
| 3,808,895 A * | 5/1974 | Fitzwater | 74/2 |
| 4,063,315 A | 12/1977 | Carolan et al. | |
| RE30,135 E | 11/1979 | Fitzwater | |
| 4,203,537 A | 5/1980 | McAlister | |
| 4,226,258 A | 10/1980 | Nakanishi | |
| 4,275,470 A | 6/1981 | Badger et al. | |
| 4,357,719 A | 11/1982 | Badger et al. | |
| 4,533,114 A * | 8/1985 | Cory et al. | 251/67 |
| 4,669,578 A * | 6/1987 | Fukamachi | 185/40 R |
| 4,757,684 A * | 7/1988 | Wright | 60/404 |
| 4,901,752 A | 2/1990 | Horvei | |
| 4,947,492 A | 8/1990 | Vincent | |
| 5,065,786 A | 11/1991 | Rozenblatt | |
| 5,178,361 A | 1/1993 | Gilbert et al. | |
| 5,228,645 A | 7/1993 | Reinicke | |
| 5,255,706 A | 10/1993 | Chudakov | |
| 5,707,027 A | 1/1998 | Hiesener | |
| 5,769,124 A | 6/1998 | Ehrhardt | |

(Continued)

FOREIGN PATENT DOCUMENTS

| | | |
|---|---|---|
| DE | 2123677 | 11/1972 |
| EP | 0901542 | 4/2002 |
| EP | 0931720 | 8/2003 |
| WO | 2007/017831 | 2/2007 |

OTHER PUBLICATIONS

Extended European Search Report—EP08252623.7.

*Primary Examiner* — John Fristoe, Jr.
(74) *Attorney, Agent, or Firm* — Cindy Murphy LLC (57) ABSTRACT

A valve assembly (20) for an aircraft water supply system. The valve assembly (20) comprises a valve member (40), an electrical motor (64), and a mechanical returning mechanism (80). When electrical power is provided, the motor (64) can be controlled to move the valve member (40) from a first position and to a second position. The mechanism (80) is operably connected to the valve member (40) and mechanically biases it towards the first position. If a power loss occurs when the valve member (40) is in the second position, the returning mechanism (80) non-electrically (e.g., mechanically) returns the valve member (40) to the first position.

18 Claims, 8 Drawing Sheets

U.S. PATENT DOCUMENTS

| | | |
|---|---|---|
| 5,823,401 A | 10/1998 | Zgoda |
| 5,904,669 A | 5/1999 | Schildgen et al. |
| 6,012,678 A | 1/2000 | Hale et al. |
| 6,170,509 B1 * | 1/2001 | Karta .......................... 137/78.4 |
| 6,186,471 B1 * | 2/2001 | Genga et al. ............. 251/129.12 |
| 7,055,183 B2 | 6/2006 | Hoehne et al. |
| 2001/0035510 A1 | 11/2001 | Oh |
| 2005/0103725 A1 | 5/2005 | Palm et al. |

* cited by examiner

VALVE ASSEMBLY FOR AIRCRAFT WATER SUPPLY SYSTEM

RELATED APPLICATIONS

This application is related to U.S. Provisional Application No. 60/954,822 filed on Aug. 9, 2007, and U.S. Provisional Application No. 60/987,438 filed on Nov. 13, 2007. The entire disclosures of these applications are hereby incorporated by reference. If incorporated-by-reference subject matter is inconsistent with subject matter expressly set forth in the written specification and drawings of this disclosure, this disclosure governs to the extent necessary to eliminate indefiniteness and/or clarity-lacking issues.

GENERAL FIELD

An aircraft water supply system including a valve assembly with a valve member moved by an electrical motor between a first position and a second position.

BACKGROUND

An aircraft commonly includes a water supply system for providing potable water to respective outlets of various water-using devices (e.g., sink faucets, coffee brewers, toilets, etc.). An aircraft water supply system can comprise, for example, a tank and a series of plumbing lines for supplying the outlets 14, filling the tank, draining the tank, and/or venting the tank. One or more valve assemblies installed in the plumbing lines for preflight, post-flight, and in-flight purposes. At least some of the valve assemblies are electrically driven so that they can be opened/closed automatically and/or remotely.

SUMMARY

A valve assembly comprises a valve member, an electrical motor that moves the valve member between a first position (e.g., opened/closed position) and a second position (e.g., closed/opened position), and a return device operably connected to the valve member. The return device is in a mechanically relaxed condition when the valve member is in the first position and a biased condition when the valve member is the second position. If the motor's electrical power is lost and the valve member is in the second position, the return member mechanically returns the valve member to the first position.

DETAILED DESCRIPTION

Figure 1:
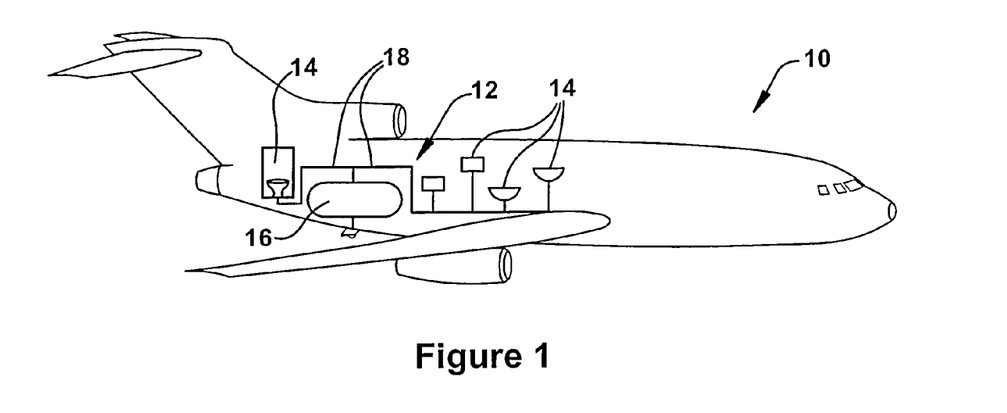
FIG. 1 is a perspective view of an aircraft with a water supply system that includes one or more electrically driven valve assemblies.

Referring now to the drawings, and initially to FIG. 1, an aircraft 10 including a water supply system 12 is shown in FIG. 1. The system 12 provides potable water to respective outlets of various water-using devices 14 (e.g., sink faucets, coffee brewers, toilets, etc.) onboard the aircraft 10.

Figure 2:
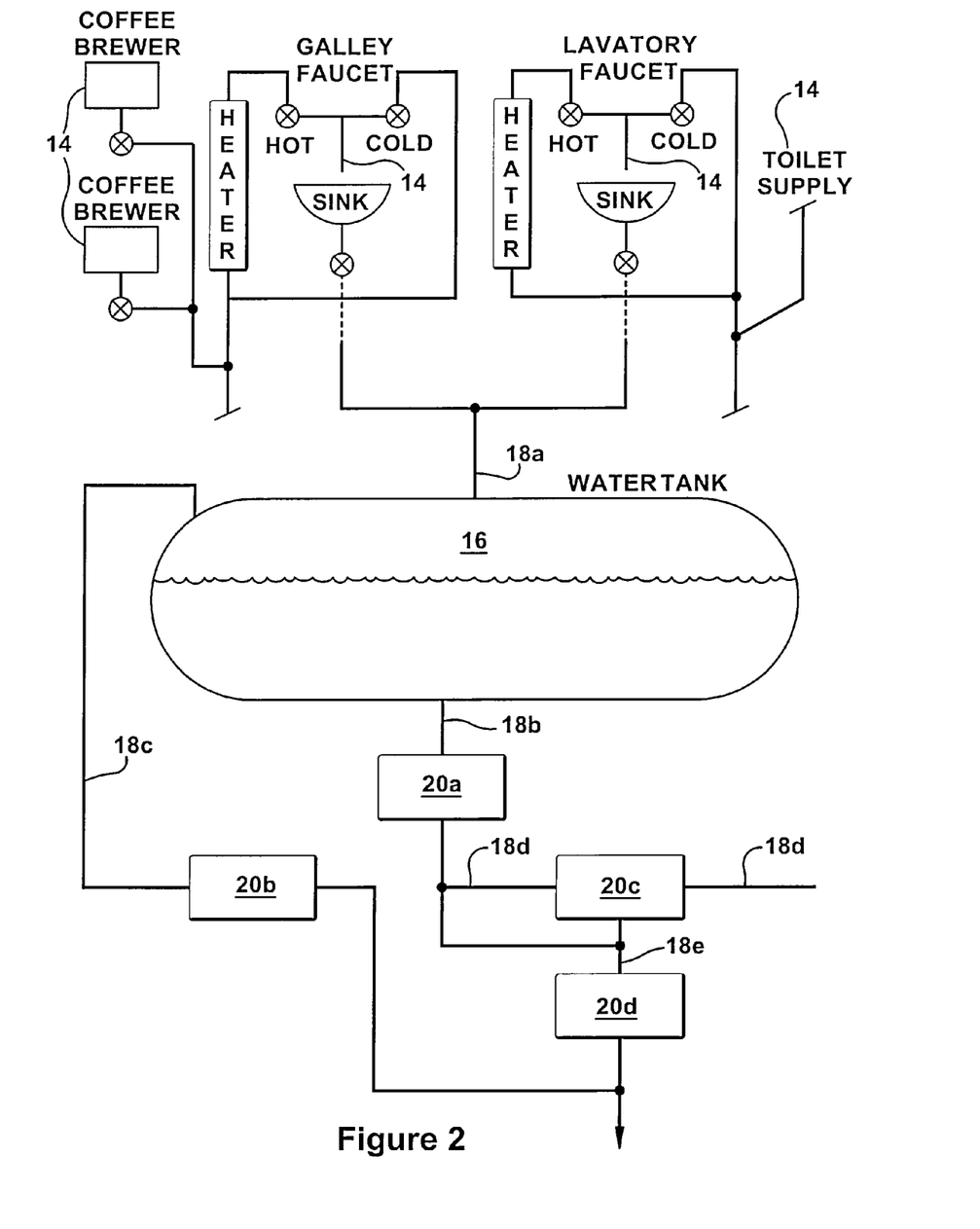
FIG. 2 is a schematic diagram of the aircraft water supply system.

Referring additionally to FIG. 2, the aircraft water supply system 12 is schematically shown in more detail. The system 12 can comprise a tank 16 and a series of plumbing lines 18 for supplying the outlets 14, filling the tank 16, draining the tank 16, and/or venting the tank 16. For example, in the illustrated embodiment, the system 12 comprises outlet-supply lines 18a, a fill-drain line 18b, a tank-overflow (and/or tank-ventilation) line 18c, a fill line 18d (for pre-flight connection to an external water source), and a drain line 18e (for post-flight connection to an external sewer).

The system 12 can further comprise one or more valve assemblies 20 in the plumbing lines 18 for opening/closing for these lines for pre-flight, post-flight, and in-flight purposes. For example, a tank-isolation valve assembly 20a can be positioned in the tank's fill-drain line 18b; a tank-venting valve assembly 20b can be positioned in the tank-overflow line 18c, a tank-fill valve 20c can be positioned in the fill line 18d, and a drain-plug valve 20d can be positioned in the drain line 18e.

To fill the tank 16 (e.g., during preflight procedures), the valve assembly 20a, the valve assembly 20b, and the valve assembly 20c would each be in an opened condition. The valve assembly 20d would be in a closed condition. Water from an external source would be pumped through the fill line 18d, through the tank's line 18b, and into the tank 16. Air within the tank 16 would be vented through the line 18c.

To drain the tank 16 (e.g., during post-flight procedures), the valve assembly 20a and the valve assembly 20d would each be in an opened condition. The valve assembly 20c would be in an closed condition. Water would be drained from the tank 16 through line 18b to line 18e and into an external sewer.

During normal flight operation, the valve assembly 20a and the valve assembly 20c would each remain in a closed condition. The valve assembly 20b and the valve assembly 20d could remain in an opened condition to allow emergency overflow drain from the tank 16.

Figure 3:
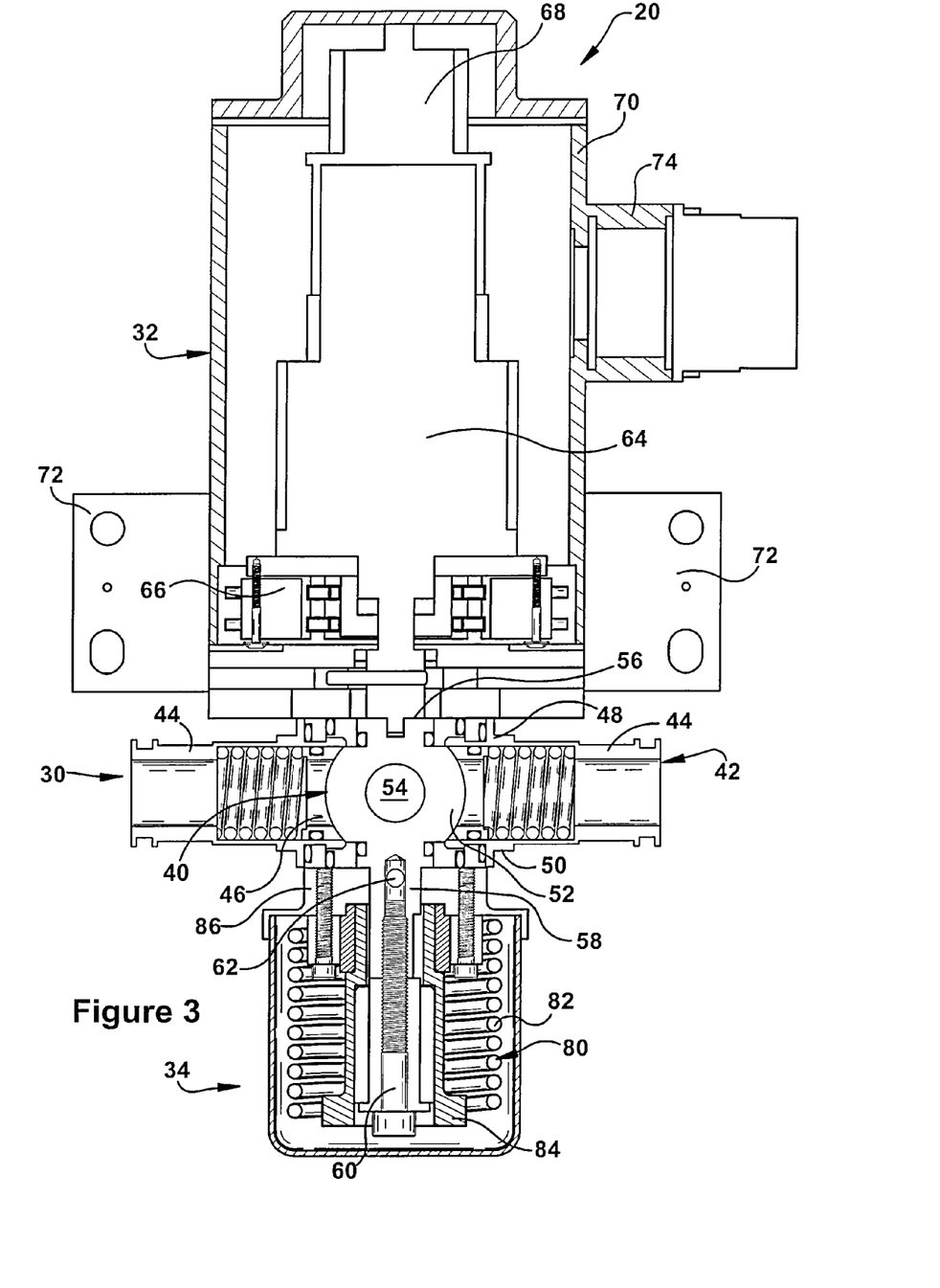
FIG. 3 is a sectional view of an electrically driven valve assembly, the valve assembly including a valve device, an electrical motor device, and mechanical return device.

Turning now to FIG. 3, the valve assembly 20 is shown isolated from the rest of the water supply system 12. The valve assembly 20 comprises a valve device 30, an electrical motor device 32, and a return device 34. The valve device 30 includes a valve member 40 movable by the electrical motor device 32 between a first position and a second position. The first position can be an opened position and the second position can be a closed position (corresponding to the valve assembly 20 being in an opened condition and closed condition, respectively). Or the first position can be closed position and the second position can be the opened position.

One of the first position or second position can be a predetermined preferred position in the event of a power loss. In some constructions and/or circumstances, the preferred position will be the opened position, while in others it will be the closed position. If an analogy is made to a solenoid-style valve, this predetermined preferred position would correspond to the normally-opened or normally-closed design of the solenoid. In any event, for ease in explanation, the first position can be considered the preferred power-loss position.

The return device 34 is operably connected to the valve member 40. The return device 34 is in a mechanically relaxed condition when the valve member 40 is in the first position and is in a mechanically biased condition when the valve member 40 is the second position. Thus, if a power loss occurs when the valve member 40 is in the second position, the return device 34 can automatically (and non-electrically) return the valve member 40 to the first position.

The valve device 30 includes (in addition to the valve member 40), a valve body 42 defining input-output connectors 44 and a chamber 46 therebetween. In the water supply system 12, for example, the connectors 44 would be joined to segments of the relevant plumbing line 18. When the valve assembly 20 is in its opened condition (i.e., the valve member 40 is in its opened position), a fluid flow path is formed from one connector 44 through the chamber 46 and to the other connector 44. Heating coils (shown but not specifically numbered) can be installed in the connectors 44 to prevent freezing within the chamber 46.

The valve device 30 and/or the valve body 42 can further comprise a motor-mounting plate 48 and a return-mounting plate 50. The mounting plates 48 and 50 can be bolted or otherwise fixedly attached to the motor device 32 and the return device 34, respectively. The valve member 40 is movably mounted relative to the valve body 42 (and/or the mounting plates 48/50). Suitable seals (some shown, but not specifically numbered) can be situated between the various valve parts and/or between valve-interfacing parts of the devices 32 and 34.

The valve member 40 can comprise a fluid-interacting portion 52 positioned within the chamber 46. The portion 52 can have a generally spherical shape (i.e., a ball) with a diametric fluid passageway 54 therethrough. When the valve member 40 is in its closed position (as illustrated), the chamber 46 is sealed from the fluid connectors 44 by the solid surfaces of the ball portion 52. The passageway 54 does not communicate with the fluid in the line 18. When the valve member 42 is moved (e.g., rotated 90°) to its opened position, the passageway 54 forms a flow path through the chamber 46.

The valve member 40 can comprise a crown 56 extending radially (e.g., upwardly) from the ball portion 52. The crown 56 protrudes from the valve body 42 (and the chamber 46) and is operably connected to movement-providing members (e.g., gears 66 introduced below) of the electric motor device 32.

Figure 4:
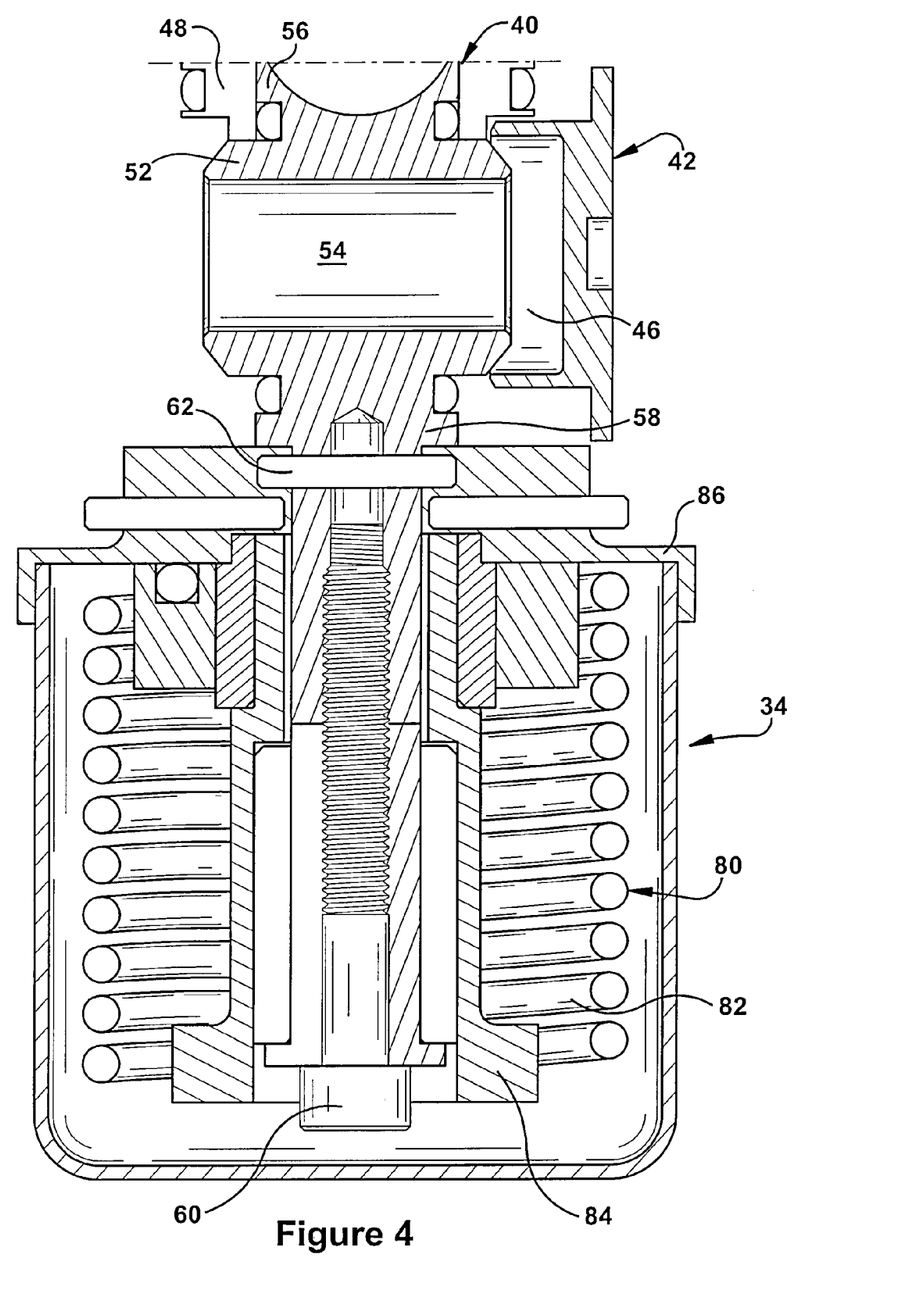
FIG. 4 is a sectional view of the mechanical return device and interacting parts of the valve device.
Figure 5:
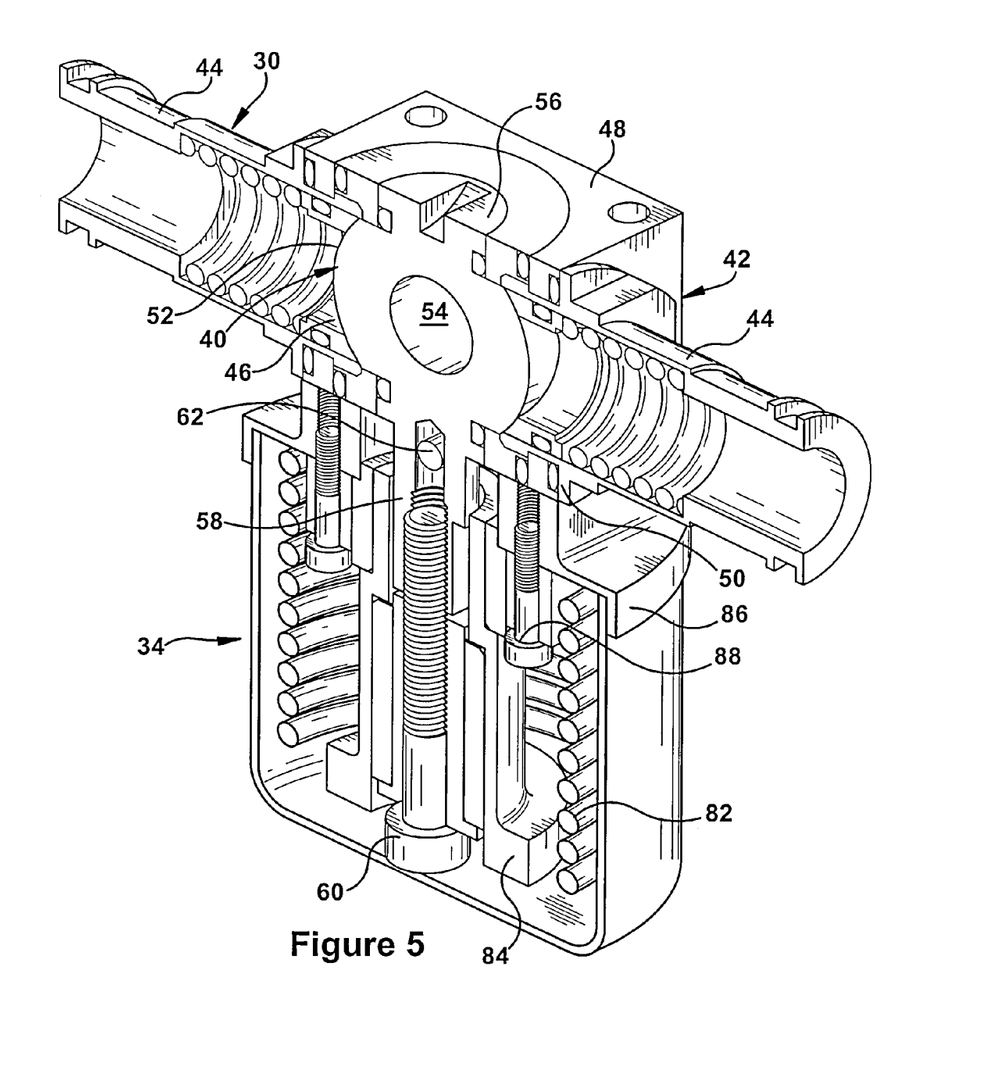
FIG. 5 is a perspective sectional view of the valve device and the mechanical return device.

The valve member 40 can also (or alternatively) comprise a stem 58 extending radially (e.g., downwardly) from its ball portion 52. The stem 58 also protrudes from the valve body 42 (and the chamber 46) and extends into the return device 34. A guide 60 within the return device 34 can interact with the stem 58 during rotation of the valve member 40. In the illustrated embodiment, the stem 58 has an internally threaded bore and the stem guide 60 has an externally threaded rod received within this bore.

The valve member 40 can further comprise a return-drive pin 62 that interacts with the return device 34. In the illustrated embodiment, the return-drive pin 62 extends transversely through and beyond the stem 58.

The motor device 32 can comprise an electrical motor 64 that produces rotational motion, gears 66 that transfer this motion to the valve member 40 via the crown 56, and an electrical brake 68. In the illustrated embodiment, when power is applied, the motor 64 and gears 66 drive the valve member 40 from the closed position to the open position. That is, they turn the ball portion 52 approximately 90° within the chamber 46. At the completion of the turn, the brake 68 can be activated to hold the position, thereby significantly reducing power draw. If the brake 68 is installed on the motor-side of the gear box (as shown), the gears 66 will assist in holding the valve position.

The motor components 64, 66 and 68 can be enclosed in a housing 70 mounted (e.g., via brackets 72) to convenient location in the aircraft 10. The housing 70 can be attached to the valve's mounting plate 48 or otherwise fixed or mounted to the valve body 42. Electrical power/control lines can extend to the motor 64 and/or brake 68 through a socket opening 74 in the housing 70.

The return device 34 comprises a returning mechanism 80 that is operably connected to the valve member 40 and rotates therewith during electrical operation of the valve assembly 20. The mechanism 80 can be in a mechanically relaxed condition when the valve member 40 is in the first position, and in a biased condition when the valve member is in the second position. In any event, when the valve member 40 is in the second position, the returning mechanism 80 biases it towards the first position. If the valve member 40 is in the second position, and the motor device 32 loses electrical power, the mechanism 80 non-electrically (e.g., mechanically) returns the valve member 40 to the first position.

The returning mechanism 80 can comprise a spring 82 that is wound, or biased, when the valve member 40 moves from the first position to the second position. In the illustrated embodiment, the mechanism 80 includes a torque tube 84 that winds the spring 82 during such valve movement. More specifically, the torque tube 84 interacts with the return-drive pin 62 which turns with the stem 58 when the valve member 40 is moved from the first position to the second position.

Figure 6:
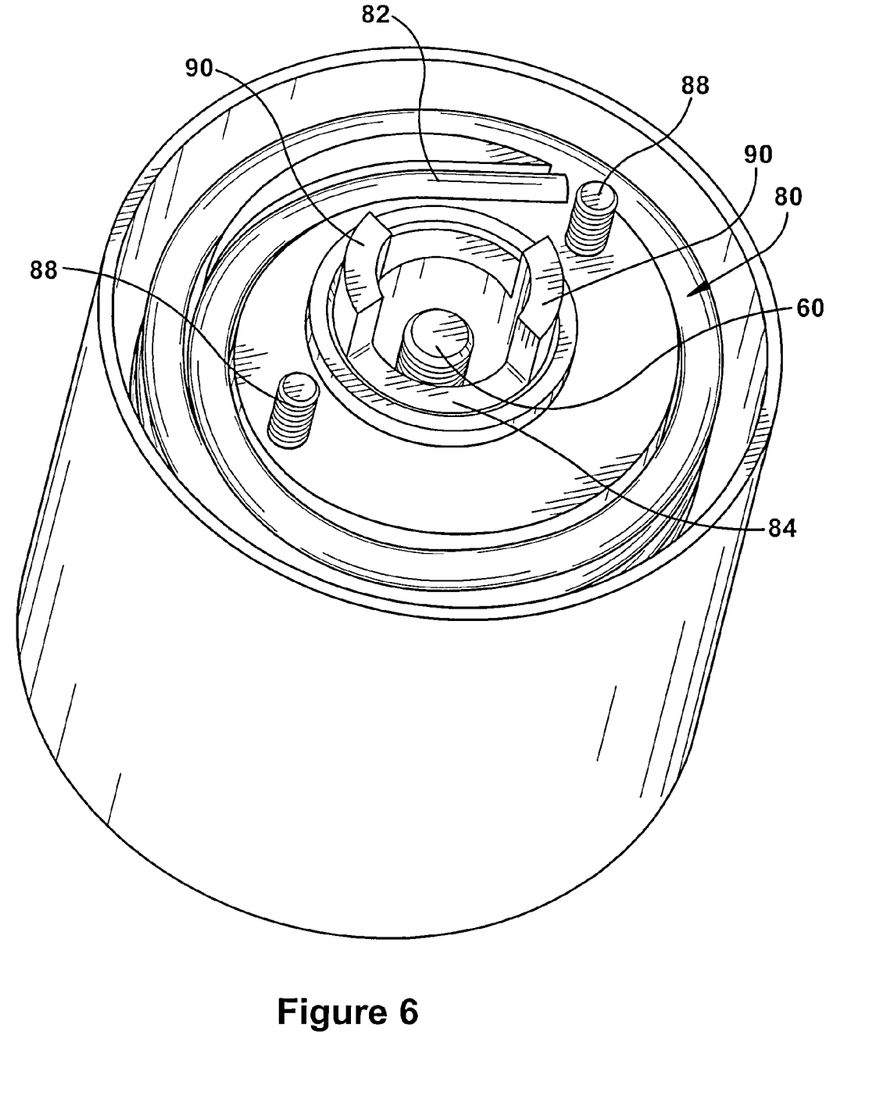
FIG. 6 is a top perspective view of the mechanical return device with its cap removed.

One end of the spring 82 (e.g., its top end) can be connected to a cap 86. (FIG. 6.) The cap 86 can be fixedly mounted to the valve body 42 (and/or mounting plate 50) via bolts 88 or other attachment means. A casing can surround the returning mechanism 80 and the cap 86 can be secured thereto.

Figure 7:
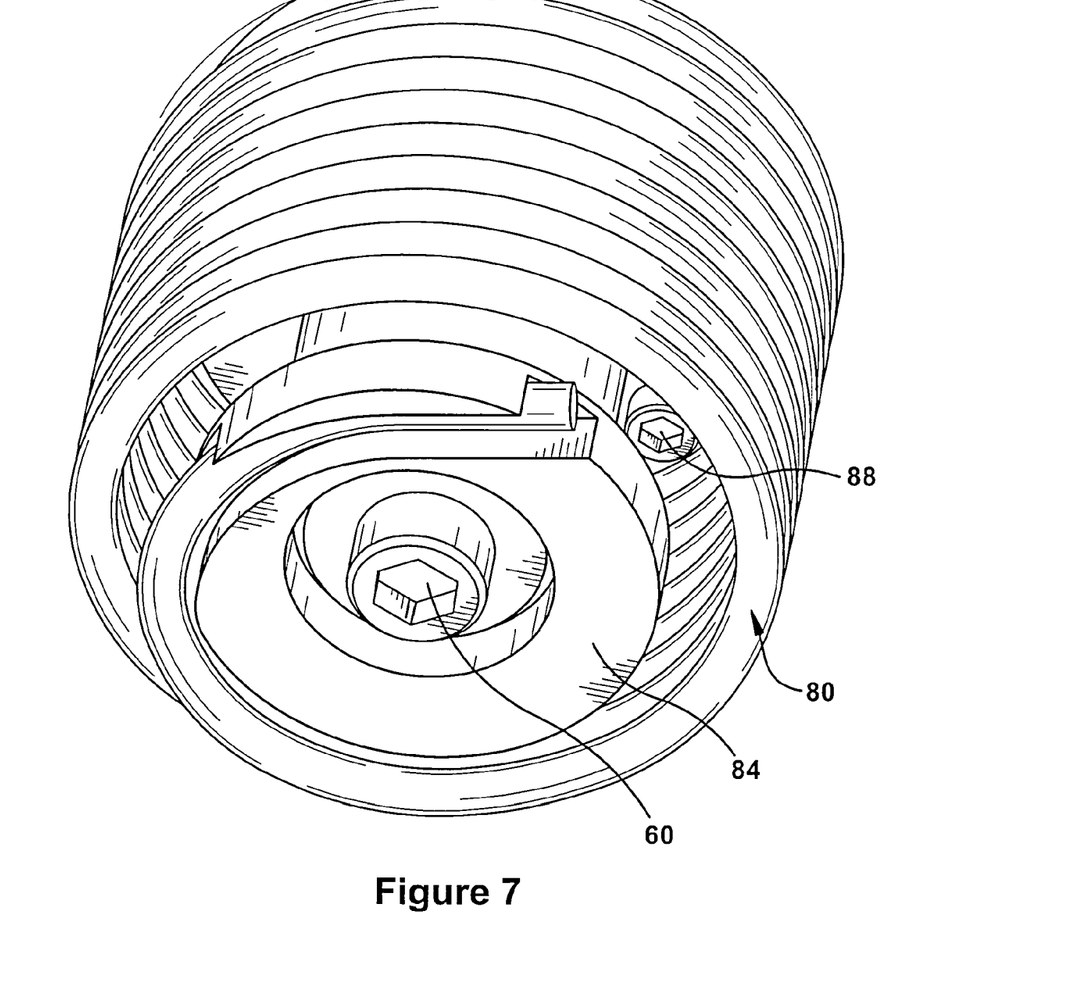
FIG. 7 is a bottom perspective view of a returning mechanism of the mechanical return device.

The other end of the spring 82 (e.g., its bottom end) can be connected to the torque member 84. (FIG. 7.) Thus, the top end of the spring 82 remains stationary (with the cap 86) and the bottom end of the spring 82 moves with the torque tube 84. In this manner, the spring 82 will be "wound" when the valve member 40 moves from the first position to the second position, and "unwound" when the valve member 40 moves from the second position to the first position.

Figure 8:
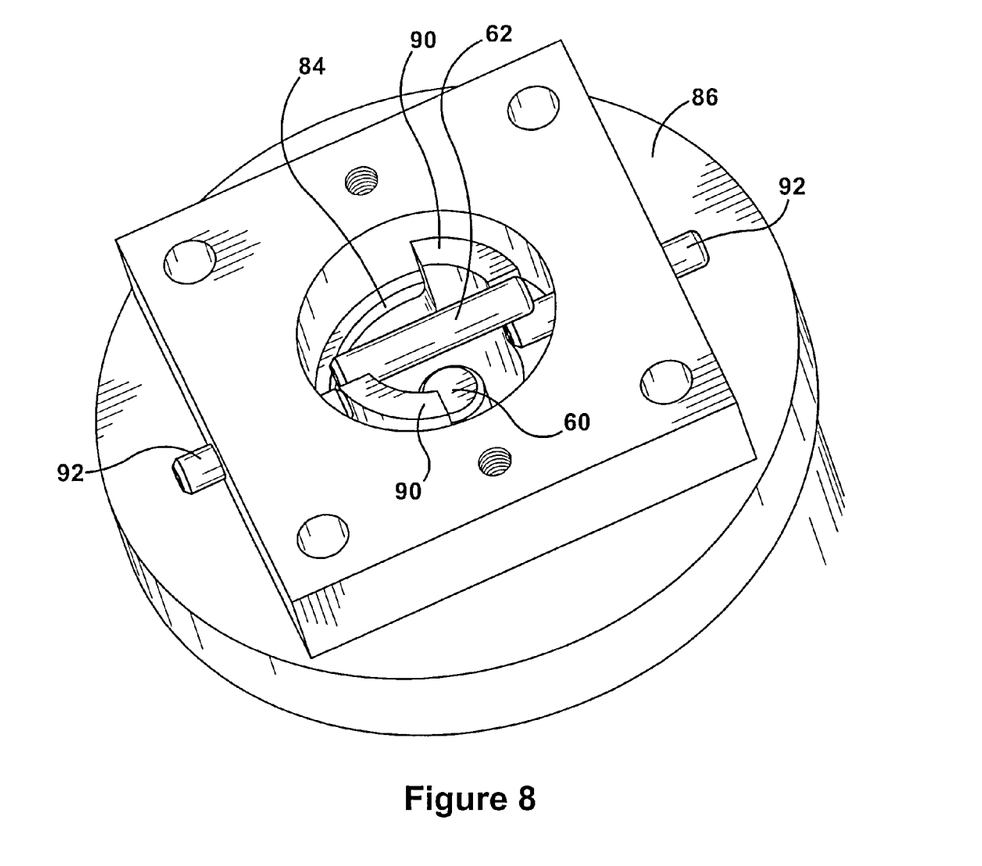
FIG. 8 is a top perspective view of the mechanical return device.

A valve-interacting portion of the torque member 84 (e.g., it top portion) includes engaging ledges 90. (FIG. 6.) During electrical operation, the drive pin 62 engages the ledges 90 and pushes them as the valve member 40 moves from the first position to the second position. (FIG. 8.) When the ledges 90 reach the second position, they encounter the stop pins 92 fixedly mounted to the cap 86. In the event of electrical loss, the ledges 90 will be spring biased back to the first position, thereby also pushing return-drive pin 62 (and thus the valve member 40) back to the first position. When the ledges 90 reach the first position, they encounter the stop pins 92.

The valve assembly 20 can be adapted for manual operation when electrical power is not being provided. Specifically, for example, the valve member 40 can be turned by a handle or other suitable tool in the appropriate direction (e.g., clockwise in FIG. 8) until the drive pin 62 is stopped by the ledges 90. This manual rotation will also drive the motor 64 and the gears 66. A manually-set valve assembly 20 will resume to normal operation when power is applied and the valve member 40 is placed in its electrically commanded position.

One may now appreciate that the valve assembly 20 allows a ball-valve construction with a solenoid-style return to a predetermined position in the event of a power loss. For these and other reasons, the valve assembly 20 can find special application in aircraft situations where solenoid-gate construction are undesirable but a loss-of-power contingency plan is necessary. Although the aircraft 10, the aircraft water supply system 12, the valve assembly 20, and the various component thereof have been shown and described with respect to a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature may have been described above with respect to only one or more of several illustrated embodiments, such a feature may be combined with one or more other features of the other embodiments, as may be desired and advantageous for any given or particular application.

The invention claimed is:

1. A valve assembly comprising:
a valve member;
an electrical motor which, when electrical power is provided, can be controlled to move the valve member from a first position and to a second position; and
a returning mechanism operably connected to the valve member and rotating therewith when the electric motor is controlled to move the valve member from the first position to the second position, the mechanism mechanically biasing the valve member towards the first position when it is the second position;
wherein, when the valve member is in the second position and the motor loses electrical power, the returning mechanism non-electrically returns the valve member to the first position; and
wherein the valve member may be manually moved between the first position and the second position, and wherein the electrical operation overrides manual operation when electrical power being supplied.

2. A valve assembly as set forth in claim 1, further comprising an electrical brake which, when electrical power is provided, locks the valve member in the second position.

3. A valve assembly as set forth in claim 1, wherein the valve member includes a ball portion.

4. A valve assembly as set forth in claim 3, wherein the electrical motor drives the valve member approximately 90° to move it from the first position to the second position.

5. A valve assembly as set forth in claim 1, wherein the returning mechanism comprises a spring.

6. A valve assembly as set forth in claim 5, wherein the returning mechanism comprises a torque member which winds the spring when the electrical motor moves the valve member from the first position to the second position.

7. A valve assembly as set forth in claim 1, wherein the first position is an OPENED position and the second position is a CLOSED position.

8. A valve assembly as set forth in claim 1, wherein the first position is a CLOSED position and the second position is an OPENED position.

9. A valve assembly comprising:
a valve member;
an electrical motor which, when electrical power is provided, can be controlled to move the valve member from a first position and to a second position; and
a returning mechanism operably connected to the valve member and rotating therewith when the electric motor is controlled to move the valve member from the first position to the second position, the mechanism mechanically biasing the valve member towards the first position when it is the second position;
wherein, when the valve member is in the second position and the motor loses electrical power, the returning mechanism non-electrically returns the valve member to the first position;
wherein the returning mechanism comprises a spring, and a torque member which winds the spring when the electrical motor moves the valve member from the first position to the second position; and
wherein the valve member may be manually moved between the first position and the second position, but electrical operation overrides manual operation when electrical power is being supplied.

10. A valve assembly as set forth in claim 9, further comprising an electrical brake which, when electrical power is provided, locks the valve member in the second position.

11. A valve assembly as set forth in claim 10, wherein the first position is one of an OPENED position and a CLOSED position, and the second position is the other of the OPENED position and the CLOSED position.

12. A valve assembly as set forth in claim 9, wherein the first position is one of an OPENED position and a CLOSED position, and the second position is the other of the OPENED position and the CLOSED position.

13. A valve assembly as set forth in claim 12, wherein the valve member includes a ball portion and wherein the electrical motor drives the valve member approximately 90° to move it from the first position to the second position.

14. A valve assembly as set forth in claim 11, wherein the valve member includes a ball portion and wherein the electrical motor drives the valve member approximately 90° to move it from the first position to the second position.

15. A valve assembly as set forth in claim 10, wherein the valve member includes a ball portion and wherein the electrical motor drives the valve member approximately 90° to move it from the first position to the second position.

16. A valve assembly as set forth in claim 9, wherein the valve member includes a ball portion and wherein the electrical motor drives the valve member approximately 90° to move it from the first position to the second position.

17. An aircraft water supply system comprising on-board water-using devices, a water tank, plumbing lines, and the valve assembly set forth in claim 1, and wherein the plumbing lines supply water from the water tank to the water-using devices.

18. A valve assembly comprising:
a valve member;
an electrical motor which, when electrical power is provided, can be controlled to move the valve member from a first position and to a second position; and
a returning mechanism operably connected to the valve member and rotating therewith when the electric motor is controlled to move the valve member from the first position to the second position, the mechanism mechanically biasing the valve member towards the first position when it is the second position;

wherein, when the valve member is in the second position and the motor loses electrical power, the returning mechanism non-electrically returns the valve member to the first position;

wherein the valve member comprises:

a ball portion that moves approximately 90° from the first position to the second position;

a crown portion extending upwardly from the ball portion and operatively connected to gears of the electric motor; and a stem extending downwardly from the ball portion and interacting with the returning mechanism.

\* \* \* \* \*